US 6,978,162 B2

(12) United States Patent
Russell et al.

(10) Patent No.: US 6,978,162 B2
(45) Date of Patent: Dec. 20, 2005

(54) INTEGRATED PORTABLE ENTERTAINMENT, INFORMATION AND COMMUNICATION SYSTEM LINKED TO A WIRELESS HELMET

(75) Inventors: Paul Grady Russell, Campbell, CA (US); Kenneth Knaus, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 674 days.

(21) Appl. No.: 09/931,034

(22) Filed: Aug. 17, 2001

(65) Prior Publication Data

US 2003/0036360 A1    Feb. 20, 2003

(51) Int. Cl.$^7$ ............................................... H04B 1/38
(52) U.S. Cl. .................. 455/575.2; 455/66.1; 455/345; 455/351; 455/569.1; 455/575.1
(58) Field of Search ....................... 340/479; 381/376; 482/8; 455/344, 90.1; 280/304.5; 701/213

(56) References Cited

U.S. PATENT DOCUMENTS

| | | | | |
|---|---|---|---|---|
| 5,465,421 A | * | 11/1995 | McCormick et al. | 455/344 |
| 5,823,557 A | * | 10/1998 | Penza | 280/304.5 |
| 6,142,913 A | * | 11/2000 | Ewert | 482/8 |
| 6,157,298 A | * | 12/2000 | Garfinkel et al. | 340/479 |
| 6,463,385 B1 | * | 10/2002 | Fry | 701/213 |
| 6,725,020 B2 | * | 4/2004 | Yagi | 455/90.1 |
| 2002/0176595 A1 | * | 11/2002 | Lazzeroni et al. | 381/376 |

* cited by examiner

Primary Examiner—Fan Tsang
Assistant Examiner—Lisa Hashem

(57) ABSTRACT

A portable entertainment system for use with a vehicle, such as a bicycle or motorcycle, and a helmet. The system may include a vehicle subsystem and a helmet subsystem. The vehicle subsystem includes a mounting device having at least one port, the mounting device adapted to connect to the bicycle, and a portable computing device positionable in the at least one port, the portable computing device having one or more digitized audio files thereon. A wireless transmitter is coupled with the portable computing device, the wireless transmitter transmitting a digitized audio signal when the portable computing device is playing a digitized audio file. The helmet subsystem includes a wireless receiver positioned on the helmet, the wireless receiver receiving the digitized audio signal from the wireless transmitter; a processor coupled with the wireless receiver, the processor converting the digitized audio signal to an analog audio signal; and speaker ear cones positioned on the helmet, the speaker ear cones connected with the processor for creating an audible audio signal from the analog audio signal. The speaker ear cones are positioned on the helmet near the user's ears without the speaker ear cones contacting the user's ears. In this manner, the user can hear traffic sounds, as needed for safety reasons, and the user can operate the vehicle without having wires interfering with the operation of the vehicle.

19 Claims, 8 Drawing Sheets

INTEGRATED PORTABLE ENTERTAINMENT, INFORMATION AND COMMUNICATION SYSTEM LINKED TO A WIRELESS HELMET

FIELD OF THE INVENTION

This application relates, in general, to wireless communication systems for vehicles such as bicycles.

BACKGROUND OF THE INVENTION

Cycling, either on a road bike, mountain bike, motorcycle, or other vehicle, is becoming increasingly popular. For safety purposes, cyclists utilize helmets to provide protection in the event of an accident.

If a cyclist wishes to listen to music or receive other audio information while cycling, safety concerns exist if the cyclist wears headphone speakers which physically cover the cyclist's ears. For instance, if a cyclist is using a conventional portable radio with a headset—such as a Sony Walkman™—safety concerns exist in that the headphone speakers physically cover the cyclist's ears and as such may be illegal in many states. Further, the wiring between the headphone speakers and the portable radio may also affect the cyclist's ability to operate the vehicle, as the wiring may become tangled or interfere with the cyclist's movement while riding.

As recognized by the present inventors, what is needed is a system and method for providing an integrated portable entertainment, information and communication system linked to a protective helmet via a wireless link, wherein the protective helmet incorporates speakers to provide audio to the cyclist and the speakers do not cover the cyclist's ears.

It is against this background that the various embodiments of the present invention were developed.

SUMMARY OF THE INVENTION

In light of the above and according to one broad aspect of one embodiment of the invention, disclosed herein is a portable entertainment system for use with a vehicle, such as a bicycle or motorcycle, and a helmet. In one embodiment, the system includes a vehicle subsystem and a helmet subsystem. The vehicle subsystem includes a mounting device having at least one port, the mounting device adapted to connect to the bicycle, and a portable computing device positionable in the at least one port, the portable computing device having one or more digitized audio files thereon. A wireless transmitter is coupled with the portable computing device, the wireless transmitter transmitting a digitized audio signal when the portable computing device is playing a digitized audio file. The helmet subsystem includes a wireless receiver positioned on the helmet, the wireless receiver receiving the digitized audio signal from the wireless transmitter; a processor coupled with the wireless receiver, the processor converting the digitized audio signal to an analog audio signal; and one or more speaker ear cones positioned on the helmet, the one or more speaker ear cones connected with the processor for creating an audible audio signal from the analog audio signal. In this manner, a user can operate the vehicle without having wires interfering with the operation of the vehicle.

Further, in another embodiment, the one or more speaker ear cones are positioned on the helmet near the user's ears without the one or more speaker ear cones contacting the user's ears, so that the user can hear traffic, as needed for safety reasons.

According to another embodiment of the invention, disclosed herein is a method of providing a wireless portable entertainment system for use with a bicycle, a helmet and a portable computing device having one or more digitized audio files thereon. The method includes providing a mounting device having at least one port, the mounting device adapted to connect to the bicycle, the at least one port adapted to receive the portable computing device; providing for a wireless transmitter to be coupled with the portable computing device, the wireless transmitter transmitting a digitized audio signal when the portable computing device is playing a digitized audio file; providing a wireless receiver positioned on the helmet, the wireless receiver receiving the digitized audio signal from the wireless transmitter; providing a processor coupled with the wireless receiver, the processor converting the digitized audio signal to an analog audio signal; and providing one or more speaker ear cones positioned on the helmet, the one or more speaker ear cones connected with the processor for creating an audible audio signal from the analog audio signal. In one embodiment, the one or more speaker ear cones are positioned near the user's ears without the one or more speaker ear cones contacting the user's ears.

According to another embodiment of the invention, disclosed herein is a helmet which includes a protective portion for protecting a wearer's head; a housing; a receiver for receiving a wireless signal to form received signal, said receiver positioned in said housing; a processor coupled with said receiver for converting the received signal into an audio signal; and one or more speakers coupled with said processor, said one or more speakers converting the audio signal into an audible signal for the wearer. The housing is positioned about a front portion of the helmet, and the one or more speakers are positioned near the user's ears without the one or more speakers contacting the user's ears.

The foregoing and other features, utilities and advantages of the invention will be apparent from the following more particular description of various embodiments of the invention as illustrated in the accompanying drawings and claims.

BRIEF DESCRIPTION OF THE DRAWINGS

FIG. 6B illustrates a left side view of the speaker ear cone of FIG. 6A, in accordance with one embodiment of the present invention.

FIG. 6C illustrates a right side view of the speaker ear cone of FIG. 6A, in accordance with one embodiment of the present invention.

DETAILED DESCRIPTION OF THE PREFERRED EMBODIMENTS

Figure 1:
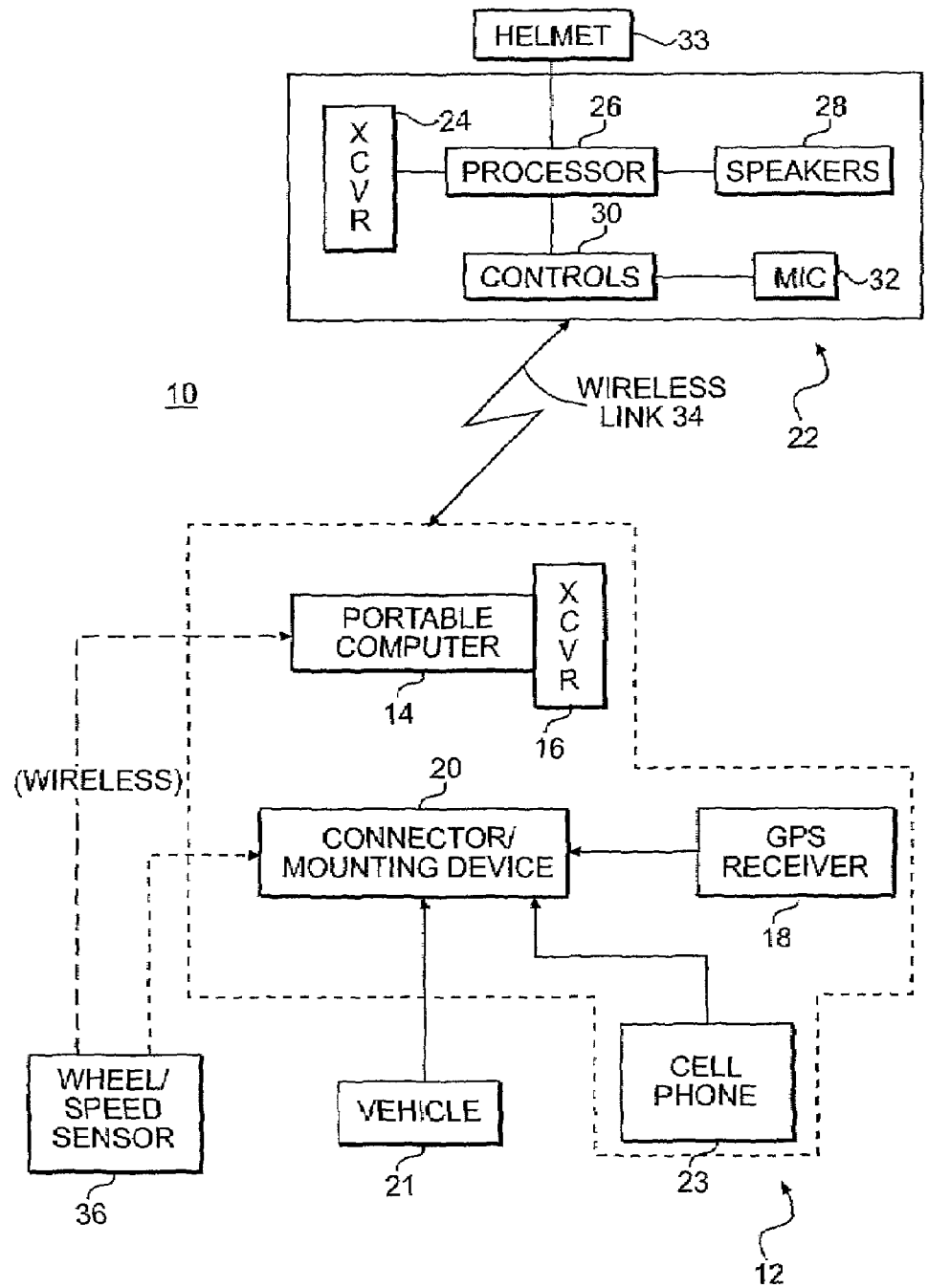
FIG. 1 illustrates a block diagram of one embodiment of the present invention, wherein a vehicle subsystem and a helmet subsystem are shown.

In accordance with the various embodiments of the present invention, a integrated portable entertainment, information and communication system is disclosed herein. FIG. 1 shows an integrated entertainment and information system 10 in accordance with one embodiment of the present invention. The integrated entertainment and information system 10 includes a vehicle subsystem 12 and a helmet subsystem 22.

In one embodiment, the vehicle subsystem 12 includes a portable computing device 14 (such as a personal data assistance (PDA) which may have one or more digitized audio files thereon), a transceiver 16 or other wireless interface, a global positioning satellite (GPS) receiver 18, and a connector/mounting device 20 for securely connecting the vehicle subsystem 12 to the vehicle 21. A cellular phone 23 and a wheel/speed sensor/odometer may also be included in the vehicle subsystem 12.

The helmet subsystem 22 includes a transceiver 24, a processor 26, speakers 28, a control pad 30 and a microphone 32, if desired, mounted on or within a helmet 33. When a digitized audio signal is received by the transceiver 24, the processor 26 converts the digitized audio signal to an analog audio signal and passes it to the speakers 28. The speakers provide an audible audio signal from the analog audio signal, so that the user can hear the music/audio content contained within the digitized audio signal.

The portable computer 14 can transmit audio signals (in digitized form) to the helmet subsystem 22 and such digitized signals can include MP3 music signals (from MP3 files stored on the portable computer), and/or other audio signals. The wireless link 34 between the vehicle subsystem 12 and the helmet subsystem 22 can be, for instance, an infrared link, or a wireless radio link (i.e., a "bluetooth" wireless link), or any other wireless link that provides reliable communications between the vehicle 21 and helmet subsystem.

The portable computer 14, in one embodiment, is loaded with a GPS software module and mapping software, such that the portable computer 14 is responsive to the GPS signals from the GPS receiver 18. The portable computer 14 can have software that uses information from the GPS receiver 18 to help provide visual and verbal navigation instructions to the cyclist (i.e., verbal navigational instructions such as text to speech can be transmitted from the portable computer 14 to the helmet subsystem 22 and heard by the user through the speakers 28). The portable computer 14 accepts GPS signal data, along with the odometer/speed sensor data, and converts it into a navigational map, which is displayed on the portable computer screen. The portable computer software can also allow trip planning and wave points. The portable computer 14 may further store actual trip data into memory for later review, or for later uploading to a personal computer for processing and storage therein.

Further, the portable computer 14 may accept data from various data acquisition devices such as heart rate monitors, altimeters, the wheel/speed sensor/odometer 36 of the vehicle 21, or the like. In one embodiment, the portable computer 14 is in communications with data acquisition devices, using either hardwired connections or wireless connections. The portable computer 14 may convert such data from data acquisition devices into viewable information on a portable computer display screen of the portable computer 14, or may store such information into memory for later review or later uploading/processing to a personal computer.

In one embodiment the portable computer 14 is in communications with the wheel/speed sensor/odometer 36 of the vehicle 21. The link therebetween can be achieved either by hard wire or by wireless connection (i.e., infrared or blue tooth). In one embodiment, the portable computer 14 converts the odometer/speed sensor data to data displayable on a "dashboard" display created on the portable computer 14, showing such data as miles/kilometers traveled, current speed, and a stopwatch/timer function.

The portable computer 14 also allows a user to interface with a desk top personal computer (not shown) to download maps, information, music, and software upgrades to the portable computer. Further, data gathered by the portable computer 14 (i.e., MP3 files) can be uploaded to the user's desk top personal computer, which may be provided with software that creates "route traveled maps," a log time traveled, a log of rider performance, health charts (i.e., heart rate charts), and other performance metrics.

As shown in the embodiment of FIG. 1, the vehicle subsystem 12 includes the connector/mounting device 20, which connects various components securely to the vehicle 21 (i.e., mounted to the handle bars of a bicycle). In one embodiment, the mounting device 20 permits the portable computer 14, the GPS receiver 18, and the cellular phone 23 to be mounted to the vehicle 21. The connector/mounting device 20 may be adapted with ports to securely receive the portable computer 14 having the transceiver 16, the GPS receiver 18, and/or the cellular phone 23. The mounting device is also provided with a protective covering that prevents the portable computer/GPS/cellular phone devices from being exposed to harsh elements such as rain, ultraviolet radiation, etc.

The connector/mounting device 20 may be configured such that it routes (on a backplane, for example) the appropriate signals between the devices in an integrated fashion—such that data from the GPS receiver 18 is accessible by the portable computer 14, and the cellular phone 23 can be controlled and operated via the portable computer 14. Further, the connector/mounting device 20 may provide a connection to the speed sensor 36 located on a wheel of the vehicle. The wheel/speed sensor 36 may have a wireless link, or may be hardwired, to the portable computer 14 through the connector/mounting device 20.

Accordingly, the integrated entertainment information 10 provides the end user with a music player, navigation system, data acquisition system (heart rate monitors, odometers, speed, altimeter, etc.), telephone, and trip computer, or combinations thereof. The integrated system 10 uses wireless links—such as infrared or radio-based (i.e., bluetooth) data transmission—to allow the vehicle subsystem 12 to communicate with the helmet subsystem 22 and thereby avoids the dangers of cables interfering with the operation of the vehicle 21.

Various embodiments of the helmet subsystem 22 are illustrated in FIGS. 2, 3, 4A–B, and 5, in accordance with various embodiments of the present invention. The helmet subsystem 22 can be provided with speaker ear cones 28 on the helmet 33, which project sound toward the user's ears, wherein the ear cones 28 do not cover the user's ears in one embodiment. Further, the helmet subsystem 22 optionally can be provided with a boom microphone 32, which allows the user the ability to use voice commands to activate or change operations with the portable computer 14, or with the cellular phone 23. In providing the cellular phone 23 at the vehicle subsystem 12, the cyclist can safely send and receive telephone calls, and in one embodiment uses voice commands to control the cellular phone 23. The boom microphone 32 on the helmet 33 permits the user to perform hands-free operations using voice commands (i.e., start playing music, answer phone, dial, etc.) without having to take his eyes away from the road, thereby allowing for the safe operation of the vehicle 21.

The helmet 33 has the helmet subsystem 22 either built in or attachable to the helmet 33. The processor 26 converts the wireless signals received from the vehicle subsystem 12 into sounds that are played through the speaker ear cones 28 to the user. The speaker ear cones 28 project the sound toward the user's ears. The speaker ear cones 28, in one embodiment, do not cover the user's ears so as to provide for greater safety, in that the user can still hear traffic noises and other noises, etc. The processor 26 can be placed in a phone mode wherein the processor 26 receives signals from the microphone 32 and converts the received signals into wireless commands that are transmitted to the portable computer/cellular phone for controlling the cellular phone 23.

Figure 2:
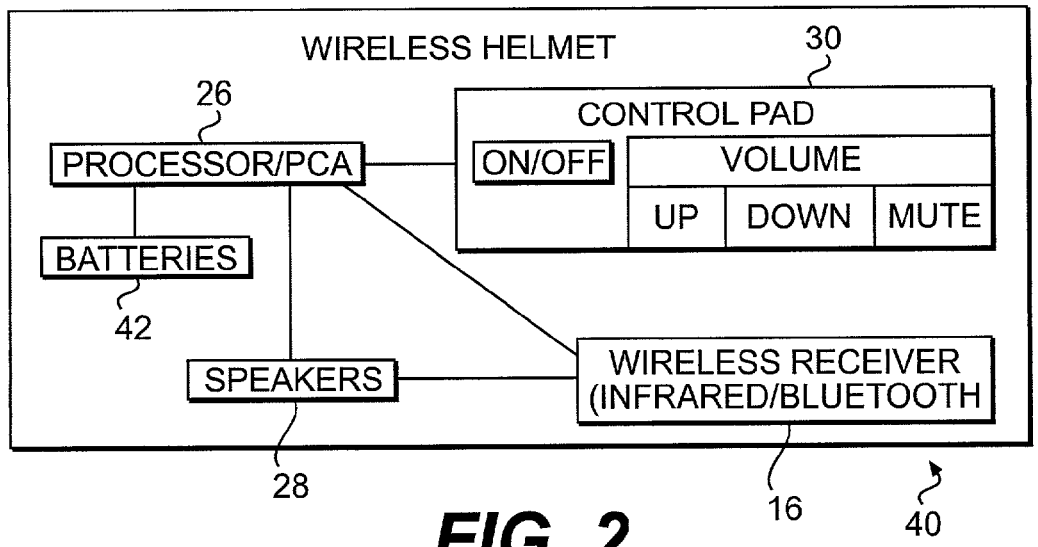
FIG. 2 illustrates a block diagram of a wireless helmet subsystem, in accordance with one embodiment of the present invention.

Referring to FIG. 2, a block diagram of one embodiment of a helmet subsystem 40 is shown, wherein the processor 26 is coupled with the control pad 30 having on/off and volume controls. The processor 26 is further coupled with the speakers 28, as well as the wireless receiver (or transceiver) 16. The processor 26 is powered with batteries 42, in one example. In particular, the processor 26 is capable of converting the wireless signals received from the wireless receiver 16 to audio signals transmitted to the user through the speakers 28. The processor 26 receives wireless data from the receiver 16, and the processor 26 converts the wireless data received to an audio signal which is delivered through the speakers 28 to the user. The user can control the volume of the audio, as well as enabling or disabling the wireless helmet subsystem.

Figure 3:
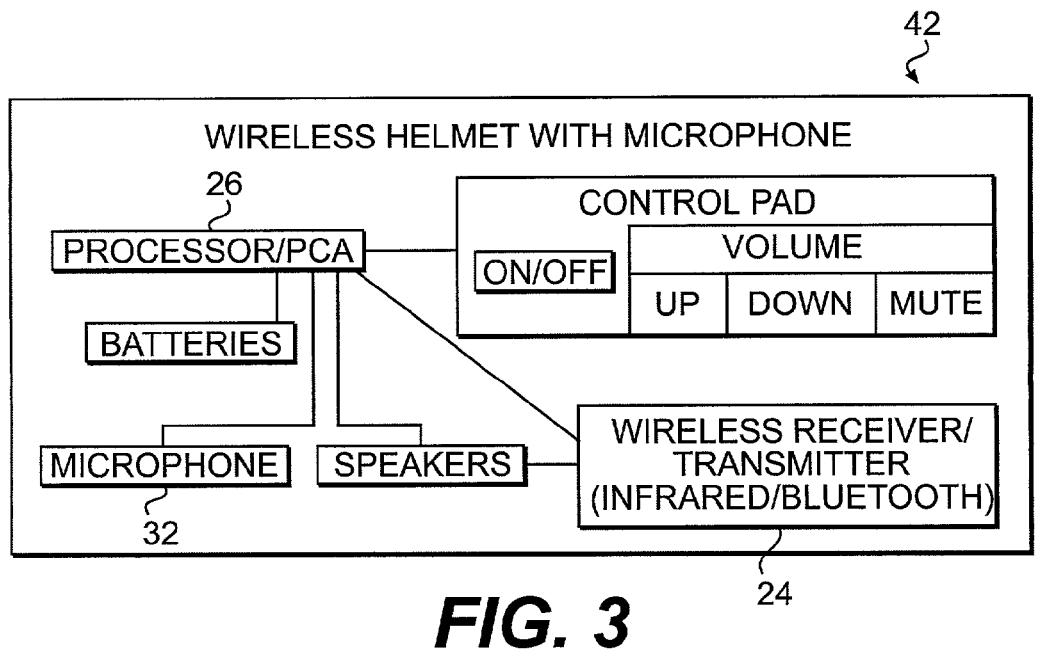
FIG. 3 illustrates a block diagram of a wireless helmet subsystem, with a microphone, in accordance with one embodiment of the present invention.

In FIG. 3, a wireless helmet subsystem 42 with a microphone 32 is shown wherein the microphone 32 is coupled as an input to the processor 26. In this embodiment, the processor 26 receives audio signals from the microphone 32 and converts those signals into digital form for transmission to the vehicle subsystem 12 (FIG. 1) through the transceiver 24.

Figure 4A:
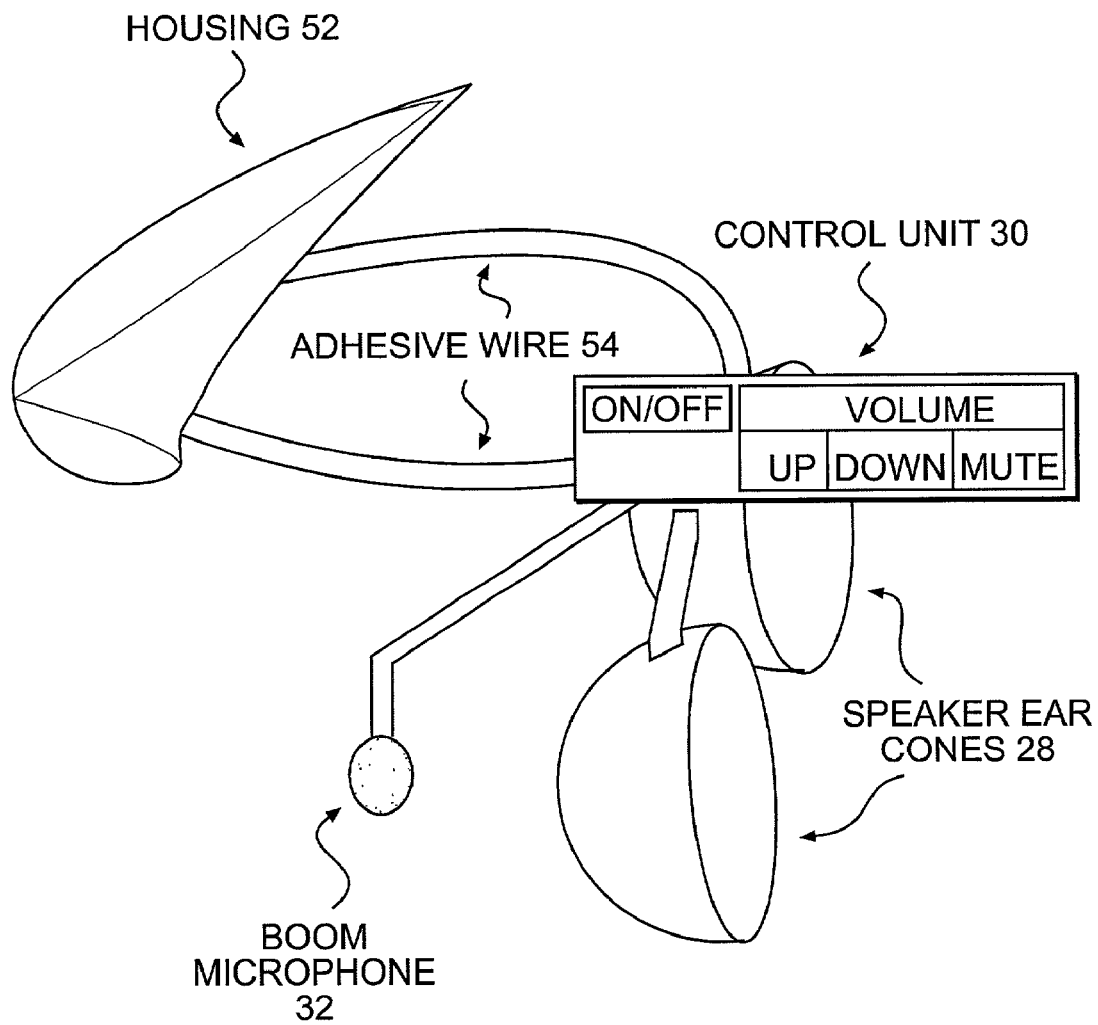
FIG. 4A illustrates an attachable system for attachment to a helmet, the system including a housing, a control unit, boom microphone, and speaker ear cones, in accordance with one embodiment of the present invention.
Figure 4B:
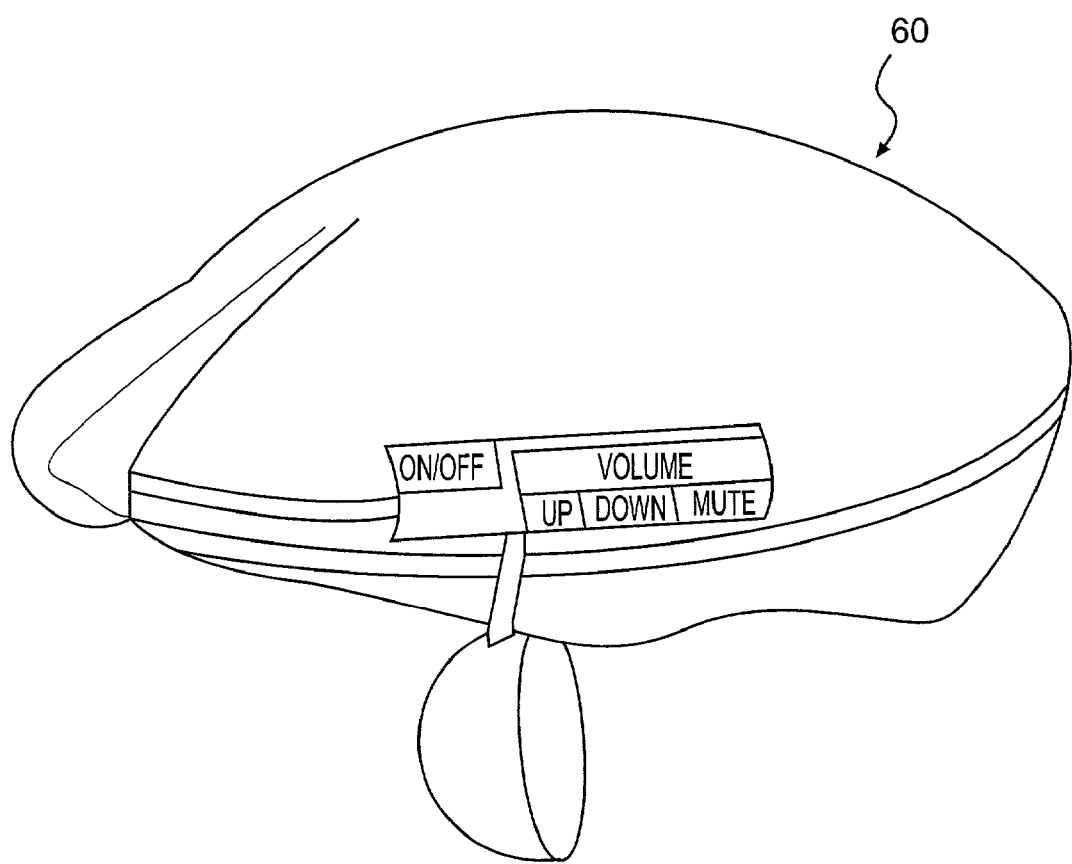
FIG. 4B illustrates a helmet with the attachable system of FIG. 4A attached thereto, in accordance with one embodiment of the present invention.
Figure 5:
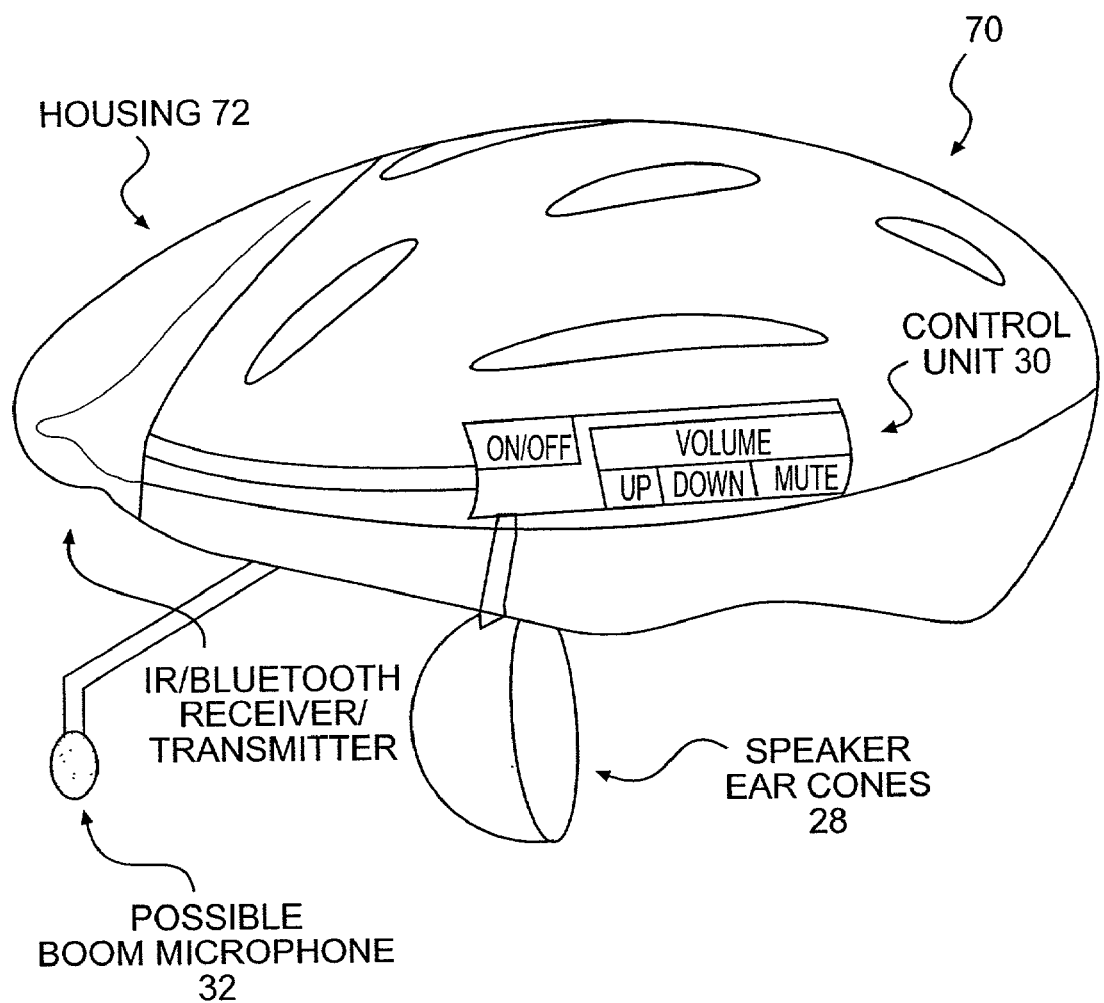
FIG. 5 illustrates a wireless helmet subsystem which is integrated into a helmet, in accordance with one embodiment of the present invention.

Referring now to FIGS. 4A–B and 5, two embodiments of the helmet and helmet subsystem are illustrated. In FIGS. 4A–B, an attachable helmet subsystem 50 is shown and includes a housing 52 for the processor, wireless receiver/transceiver, and batteries (not shown). The housing 52 is coupled with the control pad 30, the speakers 28 and microphone 32 (if provided). In one embodiment, the housing 52 is adapted to be placed on the front end of a conventional bicycle helmet 60 (FIG. 4B) so as to reduce the distance of the wireless link between the housing 52 and the transceiver 16 of the vehicle subsystem 12 positioned on the cycle's handles, in one embodiment. Further, in one example, wires 54 emanating from the housing 52 are coated with adhesives so that the wires 54 can easily be securely attached to the helmet 60. As shown in FIG. 4A, the microphone 32 is positioned in a manner such that it is positionally biased to receive voice command from the user, and the speaker ear cones 28 are positioned such that they project sound towards the user's ears during operation.

The attachable helmet subsystem 50 of FIG. 4A can be used to create a wireless helmet using a conventional, off-the-shelf bicycle helmet 60 (FIG. 4B), if desired. Alternatively, the helmet subsystem 50 may be integrated into a bicycle helmet as an OEM feature, as shown in the embodiment of FIG. 5.

As shown in FIG. 5, the helmet subsystem 50 can be integrated into a bicycle helmet 70, according to one embodiment of the present invention. As shown in FIG. 5, a housing 72 may be positioned towards the front end of the helmet 70 and the housing may include the processor, batteries, and a wireless transceiver. The housing 72 has wires emanating therefrom which connect the processor to the control pad 30, the optional microphone 32, and the speaker ear cones 28.

Figure 6A:
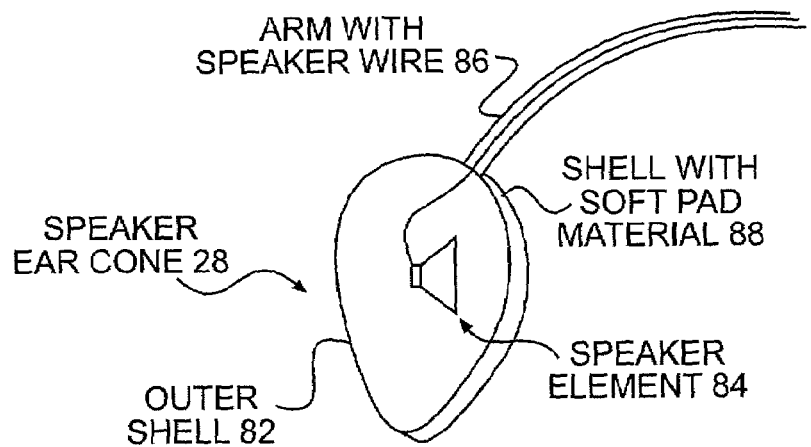
FIG. 6A illustrates a front view of a speaker ear cone, in accordance with one embodiment of the present invention.
Figure 6D:
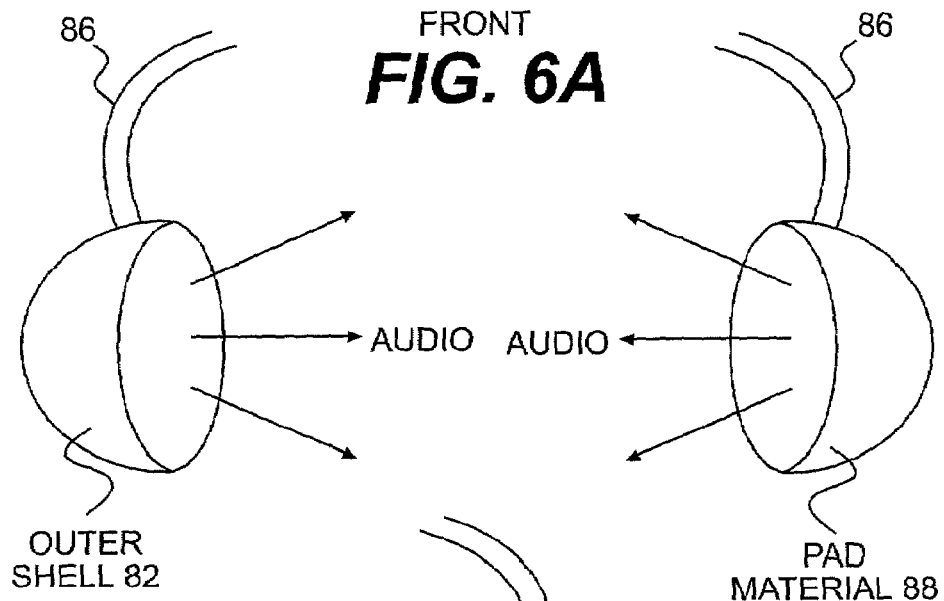
FIG. 6D illustrates a rear view of the speaker ear cone of FIG. 6A, in accordance with one embodiment of the present invention.
Figure 6D:
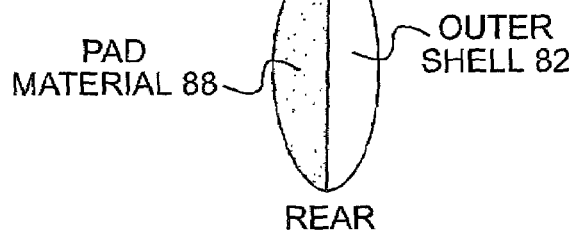

FIGS. 6A–D show various views of a speaker ear cone 28, in accordance with one embodiment of the present invention. Referring to FIG. 6A, the speaker ear cone 28 has an outer shell 82, and the speaker ear cone 28 generally has an oval cross-section with the outer shell 82 surrounding a speaker element 84 therein. An arm 86 attaches the outer shell 82 to the control unit, for structural support. A soft pad material 88 may be used on a portion of the outer shell 82, which is oriented toward the user, such that in the event of an accident the user's skin would likely contact the soft pad material 88. As shown in FIGS. 6B and 6C, a speaker ear cone is configured such that the audio signal emanating therefrom is generally directed towards the user's ear, without the speaker ear cone covering the user's ear. In this manner, the user's ear is uncovered so that the user can hear other sounds (i.e., traffic sounds) during operation.

Figure 7:
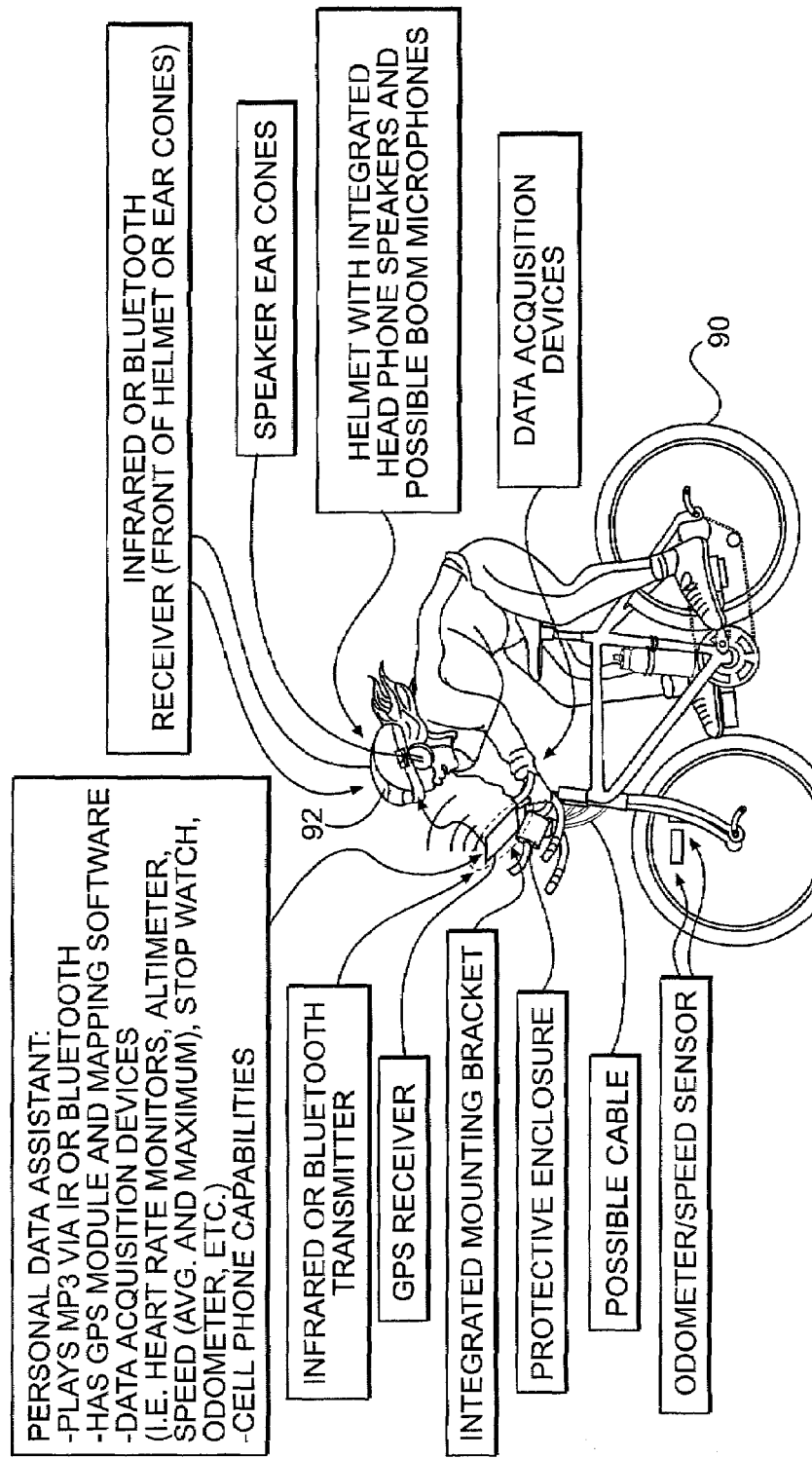
FIG. 7 illustrates a diagram of a cyclist on a bicycle having the integrated entertainment and information system thereon, in accordance with one embodiment of the present invention.

FIG. 7 illustrates a diagram of one embodiment of the present invention in use. A bicycle 90 shown in FIG. 7 is provided with an integrated entertainment and information system, while the user is wearing a helmet 92 having a wireless helmet subsystem thereon. As the user rides the bicycle 90, the user can listen to audio MP3 files through the speaker ear cones located on the helmet 92. Further, the user can view route data or other GPS data displayable on the portable computer.

Figure 8:
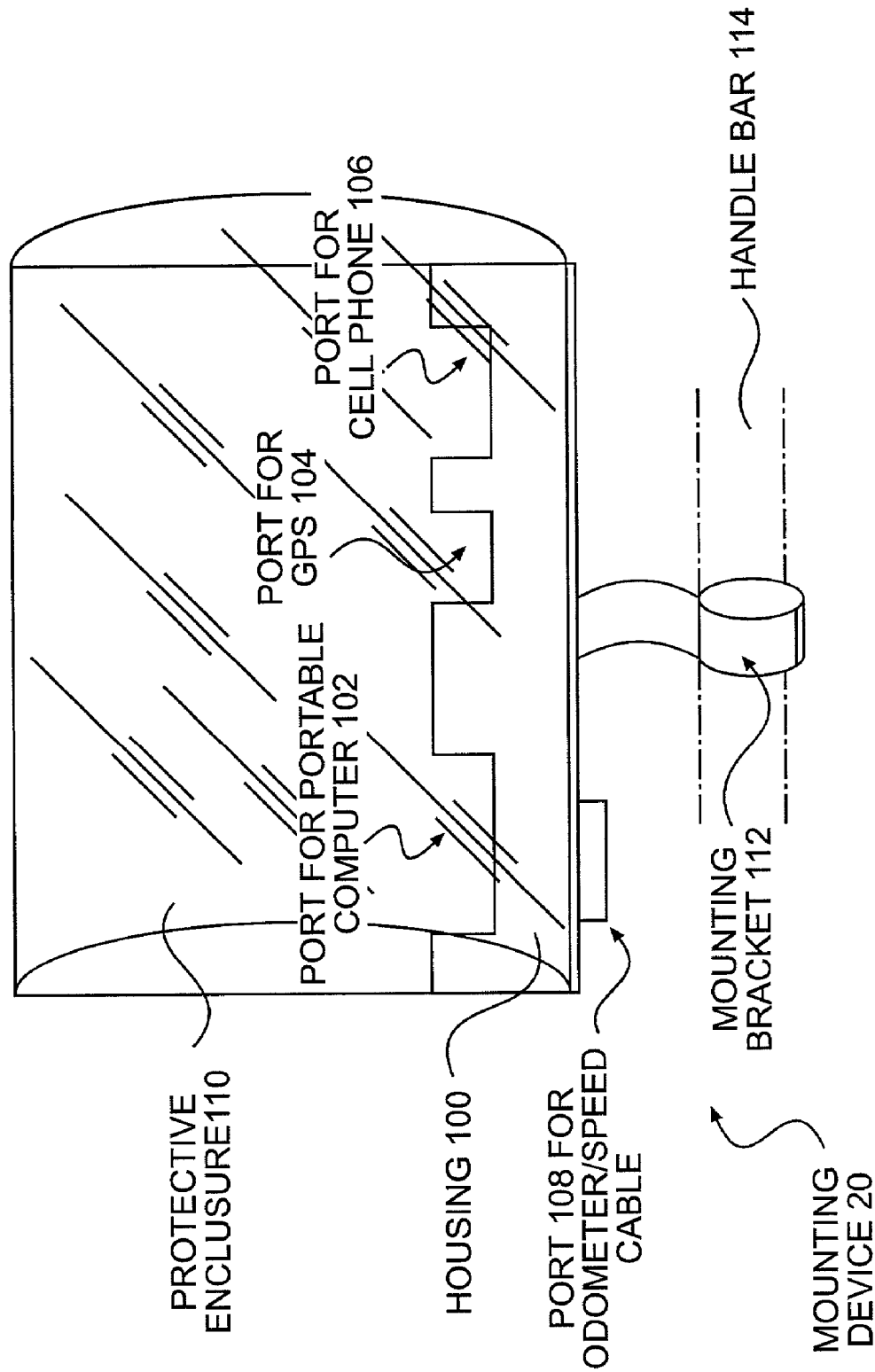
FIG. 8 illustrates a mounting device with a housing, a protective enclosure, and mounting bracket, in accordance with one embodiment of the present invention.

FIG. 8 illustrates one example of a mounting device 20 in accordance with one embodiment of the present invention. The mounting device 20 includes a housing 100 having a port 102 for securely connecting a portable computer; a port 104 for securely connecting a GPS receiver; a port 106 for securely connecting a cellular phone; and a port 108 for securely connecting an odometer/speed cable. The housing 100 may include a protective enclosure 110 that protects the portable computer/GPS/cellular phone from moisture or excessive sunlight, and in one embodiment, the protective enclosure 110 is a transparent covering or flap that surrounds the portable computer/GPS/cellular phone and that may be operable between an open and closed position. The mounting device 20 further includes a mounting bracket 112 that is adapted to removably and securely couple the housing to the handle bar 114 or other structural rigid elements of the vehicle.

In one embodiment, the mounting device 20 of FIG. 8 includes back plane wiring which connects the appropriate input/output pins of the portable computer to the appropriate input/output pins of the GPS receiver and/or the appropriate input/output pins of a cellular phone. Further, the back plane connections may include a connection for the odometer/speed cable such that the cable signal is appropriately routed to the proper devices (i.e., the portable computer and/or the GPS or cell phone as needed).

Accordingly, in operation, the integrated entertainment and information system 10 (see FIG. 1) provides a cyclist with on-board navigation, music, data acquisition, telephone, and/or a trip computer, depending on the features implemented in an embodiment of the invention. With the cellular phone, the integrated entertainment and information system would also permit the user to connect to the internet and receive information about road conditions or local points of interest.

While various embodiments of the present invention have been described and shown with reference to a bicycle and bicycle helmet, it is understood that embodiments of the present invention may be used in other implementations wherein a user wishes to receive and hear audio data from a PDA or other portable computing device in a hands-free manner using a wireless communications link. Further, while embodiments of the present invention have been described and shown using transceivers for the vehicle subsystem and the helmet subsystem, it is understood that, depending upon the particular implementation chosen, corresponding wireless transmitter/receiver pairs may be used in place of transceivers.

The foregoing embodiments and examples are to be considered illustrative, rather than restrictive of the invention, and those modifications, which come within the meaning and range of equivalence of the claims, are to be included therein. While the invention has been particularly shown and described with reference to a preferred embodiment thereof, it will be understood by those skilled in the art that various other changes in the form and details may be made without departing from the spirit and scope of the invention.

We claim:

1. A portable entertainment system for use with a bicycle and a helmet, comprising:
   a mounting device having a plurality of ports, the mounting device adapted to connect to the bicycle;
   a portable computing device positionable in the one of the plurality of ports, the portable computing device having one or more digitized audio files thereon;
   a wireless transmitter coupled with the portable computing device, the wireless transmitter transmitting a digitized audio signal when the portable computing device is playing a digitized audio file;
   a wireless receiver positioned on the helmet, the wireless receiver receiving the digitized audio signal from the wireless transmitter;
   a processor coupled with the wireless receiver, the processor converting the digitized audio signal to an analog audio signal; and
   one or more speaker ear cones positioned on the helmet, the one or more speaker ear cones connected with the processor for creating an audible audio signal from the analog audio signal, wherein the system further comprises a cellular phone positionable in one of the plurality of ports, the cellular phone providing a phone audio signal to the mounting device.

2. The system of claim 1, wherein the mounting device includes a protective covering over the portable computing device.

3. The system of claim 1, further comprising
   a GPS receiver positionable in one of the two ports, the GPS receiver providing position data.

4. The system of claim 3, wherein the portable computing device is coupled with the GPS receiver to receive and process the position data.

5. The system of claim 3, wherein the mounting device includes a back plane connecting one or more signals from the a GPS receiver with the portable computing device.

6. The system of claim 1, further comprising
   a wheel sensor providing wheel speed to the portable computing device.

7. The system of claim 1, wherein the wireless transmitter transmits the digitized audio signal as an infrared signal.

8. The system of claim 1, wherein the wireless transmitter transmits the digitized audio signal as a digital radio signal.

9. The system of claim 1, wherein the one or more speaker ear cones comprise two speaker ear cones positioned on the helmet near a user's ears without the two speaker ear cones covering the user's ears.

10. The system of claim 1, wherein the wireless receiver is positioned on the front end of the helmet to receive the digitized audio signal from the wireless transmitter.

11. A portable entertainment system for use with a bicycle and a helmet, comprising:
    a mounting device having at least one port, the mounting device adapted to connect to the bicycle;
    a portable computing device positionable in the at least one port, the portable computing device having one or more digitized audio files thereon;
    a first wireless transceiver coupled with the portable computing device, the first wireless transceiver transmitting a digitized audio signal when the portable computing device is playing a digitized audio file;
    a second wireless transceiver positioned on the helmet, the second wireless transceiver receiving the digitized audio signal from the first wireless transceiver;
    a processor coupled with the second wireless receiver, the processor converting the digitized audio signal to an analog audio signal; and
    two speaker ear cones positioned on the helmet, the two speaker ear cones connected with the processor for creating an audible audio signal from the analog audio signal, wherein the two speaker cones do not cover a user's ears and are positioned substantially perpendicular to the user's ears.

12. The system of claim 11, further comprising:
    a microphone coupled with the processor for receiving voice audio from a user of the helmet.

13. The system of claim 12, wherein the processor converts the voice audio from the microphone to a digitized voice signal, and the processor passes the digitized voice signal to the second transceiver for transmission to the first transceiver.

14. The system of claim 13, wherein the digitized voice signal is received by the first transceiver and convened into a control signal.

15. A method of providing a wireless portable entertainment system for use with a bicycle, a helmet and a portable computing device having one or more digitized audio files thereon, the method comprising:

providing a mounting device having at least one port, the mounting device adapted to connect to the bicycle, the at least one port adapted to receive the portable computing device;

providing for a wireless transmitter to be coupled with the portable computing device, the wireless transmitter transmitting a digitized audio signal when the portable computing device is playing a digitized audio file;

providing a wireless receiver positioned on the helmet, the wireless receiver receiving the digitized audio signal from the wireless transmitter;

providing a processor coupled with the wireless receiver, the processor converting the digitized audio signal to an analog audio signal; and providing one or more speaker ear cones positioned on the helmet, the one or more speaker ear cones connected with the processor for creating an audible audio signal from the analog audio signal wherein the one or more speaker cones do not cover a user's ears.

16. The method of claim 15, further comprising:

positioning the one or more speaker ear cones substantially perpendicular to the user's ears without the one or more speaker ear cones contacting the user's ears.

17. A helmet, comprising:

a protective portion for protecting a wearer's head;

a housing;

a receiver for receiving a wireless signal to from a received signal, said receiver positioned in said housing;

a processor coupled with said receiver for converting the received signal into an audio signal; and one or more speakers coupled with said processor, said one or more speakers converting the audio signal into an audible signal for the wearer, wherein the one or more speakers are positioned near a user's ears without the one or more speakers covering the user's ears.

18. A method of providing wireless portable entertainment for use with a bicycle, a helmet and a portable computing device having one or more digitized audio files thereon, the method comprising:

transmitting a digitized audio signal from a wireless transmitter coupled with the portable computing device when the portable computing device is playing a digitized audio file, the portable computing device mounted on a mounting device connected to a bicycle;

receiving the digitized audio signal in a wireless receiver positioned on the helmet, the wireless receiver positioned on the helmet;

converting the digitized audio signal to an analog audio signal in a processor coupled with the wireless receiver; and creating an audible audio signal from the analog audio signal in one or more speaker ear cones positioned on the helmet, the one or more speaker ear cones connected with the processor, wherein the one or more speaker cones do not cover a user's ears and are positioned substantially perpendicular to the user's ears.

19. A system for providing wireless portable entertainment for use with a bicycle, a helmet and a portable computing device having one or more digitized audio files thereon, the method comprising:

means for transmitting a digitized audio signal from a wireless transmitter coupled with the portable computing device when the portable computing device is playing a digitized audio file, the portable computing device mounted on a mounting device connected to a bicycle;

means for receiving the digitized audio signal in a wireless receiver positioned on the helmet, the wireless receiver positioned on the helmet;

means for converting the digitized audio signal to an analog audio signal in a processor coupled with the wireless receiver; and means for creating an audible audio signal from the analog audio signal in one or more speaker ear cones positioned on the helmet, the one or more speaker ear cones connected with the processor, wherein the one or more speaker cones do not cover a user's ears and are positioned substantially perpendicular to the user's ears.

* * * * *